US011544873B2

(12) United States Patent
Chen et al.

(10) Patent No.: US 11,544,873 B2
(45) Date of Patent: Jan. 3, 2023

(54) HIGH RESOLUTION 3D IMAGE PROCESSING APPARATUS AND METHOD THEREOF

(71) Applicant: Artilux, Inc., Menlo Park, CA (US)

(72) Inventors: Shu-Lu Chen, Hsinchu County (TW); Yu-Shiuan Li, Hsinchu County (TW); Yun-Chung Na, Hsinchu County (TW)

(73) Assignee: ARTILUX, INC., Menlo Park, CA (US)

( * ) Notice: Subject to any disclaimer, the term of this patent is extended or adjusted under 35 U.S.C. 154(b) by 343 days.

(21) Appl. No.: 16/807,179

(22) Filed: Mar. 3, 2020

(65) Prior Publication Data

US 2020/0286260 A1 Sep. 10, 2020

Related U.S. Application Data

(60) Provisional application No. 62/869,570, filed on Jul. 2, 2019, provisional application No. 62/813,776, filed on Mar. 5, 2019.

(51) Int. Cl.
*G06T 15/00* (2011.01)
*G06T 7/80* (2017.01)
*G06T 17/00* (2006.01)

(52) U.S. Cl.
CPC .............. *G06T 7/80* (2017.01); *G06T 17/00* (2013.01); *G06T 2200/04* (2013.01)

(58) Field of Classification Search
CPC .... G06T 7/50; G06T 7/80; G06T 7/97; G06T 15/00; G06T 2207/10016; G06T 17/00; G06T 2200/04; G06T 7/55; H04N 13/271; H04N 13/243; H04N 13/25
See application file for complete search history.

(56) References Cited

U.S. PATENT DOCUMENTS

| | | | |
|---|---|---|---|
| 2012/0169848 A1* | 7/2012 | Bae | H04N 13/254 348/222.1 |
| 2014/0218567 A1* | 8/2014 | Han | H04N 5/2355 348/239 |
| 2015/0237264 A1* | 8/2015 | Amitay | H04N 5/23296 348/240.2 |
| 2017/0040362 A1* | 2/2017 | Na | H01L 31/1812 |
| 2018/0231660 A1* | 8/2018 | Deane | G01S 7/4817 |

* cited by examiner

*Primary Examiner* — Hau H Nguyen
(74) *Attorney, Agent, or Firm* — Dority & Manning, P.A.

(57) ABSTRACT

Image processing apparatus and image processing method are provided. The image processing apparatus may include an image sensor having a plurality of photodetectors and include a 3D image calculating module. The image sensor may be configured to generate a first set of input information at a first time/first location and a second set of input information at a second time/second location, where the first set of input information may be associated with a first weighting value, and the second set of input information may be associated with a second weighting value. The 3D image calculating module may be configured to generate output information based on the first and the second sets of input information and the first and the second weighting values, wherein at least one of the plurality of photodetectors includes germanium.

19 Claims, 18 Drawing Sheets

HIGH RESOLUTION 3D IMAGE PROCESSING APPARATUS AND METHOD THEREOF

CROSS REFERENCE TO RELATED APPLICATIONS

This application claims the benefit of U.S. provisional application No. 62/813,776, which was filed on Mar. 5, 2019, and is included herein by reference. This application further claims the benefit of U.S. provisional application No. 62/869,570, which was filed on Jul. 2, 2019, and is included herein by reference.

BACKGROUND OF THE INVENTION

1. Field of the Invention

The present application is related to image processing, and more particularly, to an apparatus for performing image processing (e.g., for generating high resolution three-dimensional (3D) images), and relevant methods.

2. Description of the Prior Art

Nowadays, image sensors are widely used in different applications, such as digital still camera (DSC), smartphone, GoPro device, robot and vehicle. More and more applications need a high-resolution image to fulfill different requirements. For the time of flight (ToF) technical field, the resolution of the depth image is generally subjected to the pixel array size of the image sensor. As such, how to obtain a high-quality and/or high-resolution image through a smaller pixel array is a problem to be solved.

SUMMARY OF THE INVENTION

It is therefore an objective of the present application to provide an apparatus for performing image processing, and associated methods, in order to solve the above-mentioned problem.

At least one embodiment of the present application provides an image processing apparatus, where the apparatus may comprise an image sensor having a plurality of photodetectors and comprise a 3D image calculating module. The image sensor may be configured to generate a first set of input information at a first time and a second set of input information at a second time, where the first set of input information may be associated with a first weighting value, and the second set of input information may be associated with a second weighting value. The 3D image calculating module may be configured to generate output information based on the first and the second sets of input information and the first and the second weighting values, wherein at least one of the plurality of photodetectors includes germanium.

At least one embodiment of the present application provides an image processing method, where the method may comprise: generating, by an image sensor having a plurality of photodetectors, a first set of input information at a first time and a second set of input information at a second time; determining a first weighting value according to the first set of input information; determining a second weighting value according to the second set of input information; and generating an output frame based on the first set of input information, the second set of input information, the first weighting value and the second weighting value; wherein at least one of the plurality of photodetectors includes germanium.

At least one embodiment of the present application provides an image processing apparatus, where the apparatus may comprise an image sensor having a plurality of photodetectors and comprise a 3D image calculating module. The image sensor may be configured to generate a first set of input information at a first location and a second set of input information at a second location, where the first set of input information may be associated with a first weighting value, and the second set of input information may be associated with a second weighting value. The 3D image calculating module may be configured to generate output information based on the first and the second sets of input information and the first and the second weighting values, wherein at least one of the plurality of photodetectors includes germanium.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

One or more embodiments of the present disclosure are illustrated by way of example and not limitation in the figures of the accompanying drawings, in which like references may indicate similar elements, where the drawings are not necessarily drawn to scale.

DETAILED DESCRIPTION

Figure 1:
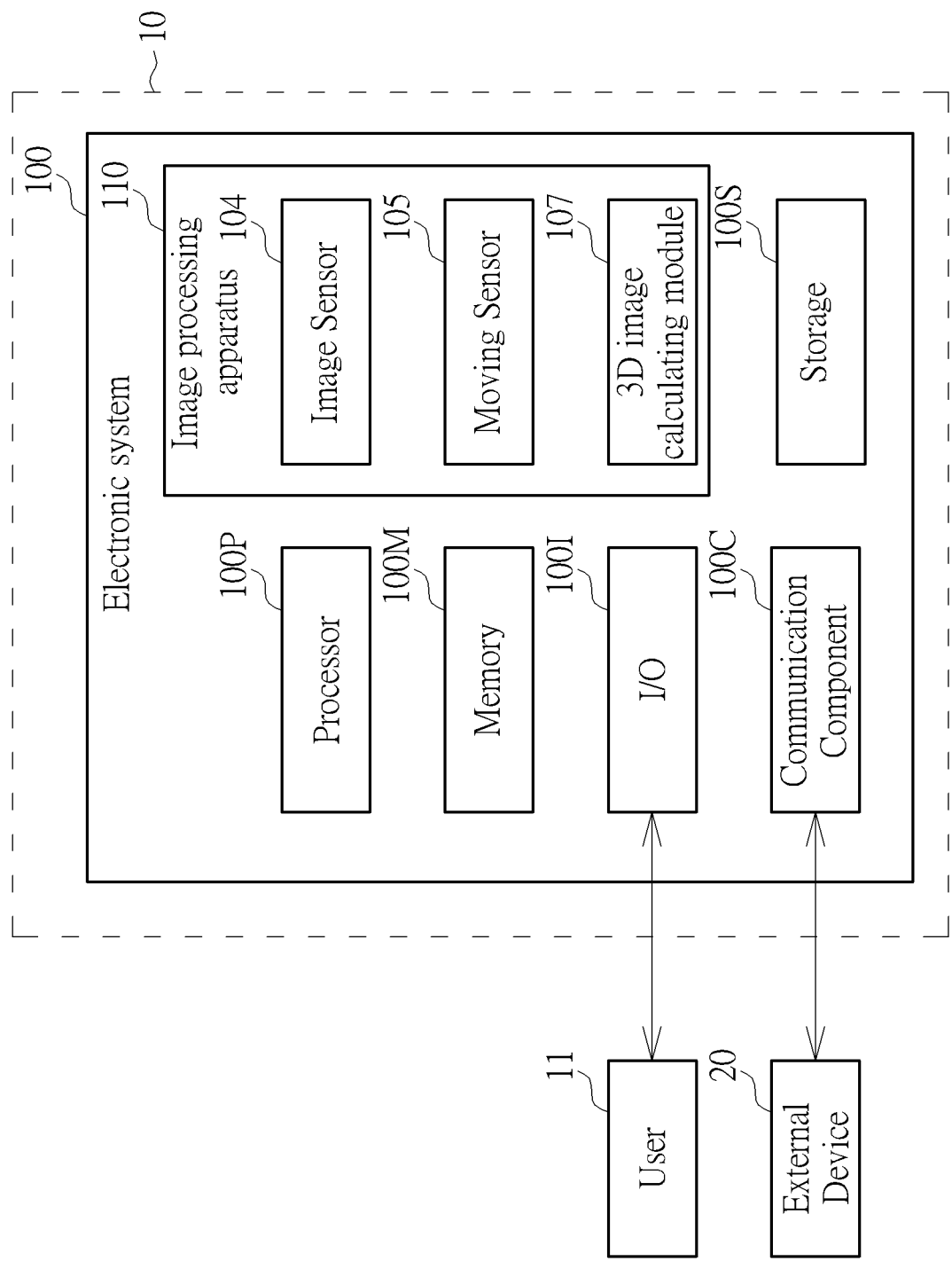
FIG. 1 is a user apparatus having image processing functionality according to an embodiment of the present application.

FIG. 1 illustrates a user apparatus 10 having image processing functionality according to an embodiment of the present application. The user apparatus 10 (e.g., smart phone, laptop or other mobile device) includes at least a portion of the electronic system 100 to be arranged to generate depth images and perform depth and/or plane resolution control. According to one embodiment of present application, as illustrated in FIG. 1, the electronic system 100 comprises a processor 100P, a memory 100M, an input/output (I/O) module 100I (labeled as "I/O"), a communication component 100C, a storage module 100S (labeled as "Storage") and an image processing apparatus 110. In one embodiment, the image processing apparatus 110 includes an image sensor 104, a moving sensor 105, and a three-dimensional (3D) image calculating module 107.

According to some embodiments, the processor 100P is configured to control the operations of the electronic system 100. The memory 100M is configured to tentatively store the data for the calculation of the processor 100P. The I/O module 100I is configured to perform I/O operations to allow the user 11 to interact with the electronic system 100. The communication component 100C is configured to perform communication operations allowing the electronic system 100 to communicate with the external device 20. The storage module 100S is configured to store the data for the usage of the user 11. The image sensor 104 is configured to perform image sensing. The moving sensor 105 is configured to perform motion sensing. The 3D image calculating module 107 is configured to perform 3D image calculation according to the image sensing results generated from the image sensor 104 and/or the motion sensing results generated from the moving sensor 105.

For better comprehension of the user apparatus 10, some possible implementations are illustrated here below. The processor 100P may be implemented by central processing unit (CPU) or graphics processing unit (GPU). The memory 100M may be implemented by random-access memory (RAM), such as Dynamic RAM (DRAM) and Static RAM (SRAM), or non-volatile memory, such as Flash memory. The I/O module 100I may be implemented by Liquid Crystal Display (LCD) panel, touch panel, touch screen, keyboard, pointing device, or audio output device. The communication component 100C may be implemented by wireless communications module (e.g., Wi-Fi or Bluetooth interfaces), and/or wired communications module (e.g., Universal Serial Bus (USB) or Lightning interfaces). The image sensor 104 uses a plurality of photodetectors to perform image sensing. These photodetectors may be implemented by silicon-based sensing material or germanium-based sensing material. The moving sensor 105 may be implemented by accelerometer or Micro-Electro-Mechanical System (MEMS) gyroscope. The storage module 100S may be implemented by mass storage device, such as Flash storage device. The 3D image calculating module 107 can be implemented by hardware, software approaches or combination thereof. In one scenario, when the 3D image calculating module 107 is implemented by hardware approach, the 3D image calculating module 107 can be an Application-Specific Integrated Circuit (ASIC). In another scenario, when the 3D image calculating module 107 is implemented by software approach, the 3D image calculating module 107 is a program which can be executed by a microprocessor, a digital signal processing (DSP) processor or the processor 100P. Notably, if the 3D image calculating module 107 is a program executed by the processor 100P, the processor 100P can be regarded as a part of the image processing apparatus 110. On the hands, the image processing apparatus 110 may not include the moving sensor 105 in some applications, meaning the moving sensor is an optional module.

According to some embodiments, the image sensor 104 including the plurality of photodetectors is configured to generate a first set of input information at a first time (e.g., a time point t1) and a second set of input information at a second time (e.g., a time point t2), where the first set of input information may be associated with a first weighting value W1, and the second set of input information may be associated with a second weighting value W2; and more particularly, the 3D image calculating module 107 may be configured to generate output information based on the first and the second sets of input information and the first and the second weighting values W1 and W2, where at least one of photodetectors may include germanium. According to some embodiments, the input information and the output information can be photo-current values, charge values, pixel values or depth values.

According to some embodiments, the image sensor 104 including the plurality of photodetectors may be configured to generate the first set of input information at a first location (e.g., a location RRL1) and the second set of input information at a second location (e.g., a location RRL2), where the first set of input information may be associated with the first weighting value W1, and the second set of input information may be associated with the second weighting value W2; and more particularly, the 3D image calculating module 107 may be configured to generate the output information based on the first and the second sets of input information and the first and the second weighting values W1 and W2, where at least one of photodetectors may include germanium.

According to some embodiments, the moving sensor 105 may be configured to detect a movement of the user apparatus 10, and more particularly, may comprise a gyroscope (e.g., a MEMS gyroscope), where the first set of input information may be generated before the movement, and the second set of input information may be generated after the movement. During operation, the 3D image calculating module 107 may determine the first and the second weighting values W1 and W2 based on the movement of the user apparatus 10. In addition, the 3D image calculating module 107 may generate the output information based on an image binning process. In some embodiments, the image binning process may comprise an overlapping binning process or a non-overlapping binning process. In addition, the 3D image calculating module 107 may perform the image binning process by dividing any set of the first set of input information and the second set of input information into a plurality of binning clusters. For example, the plurality of binning clusters may have the same dimension or have two or more different dimensions. In other implementations, the plurality of binning clusters may be dynamically adjusted.

Figure 2:
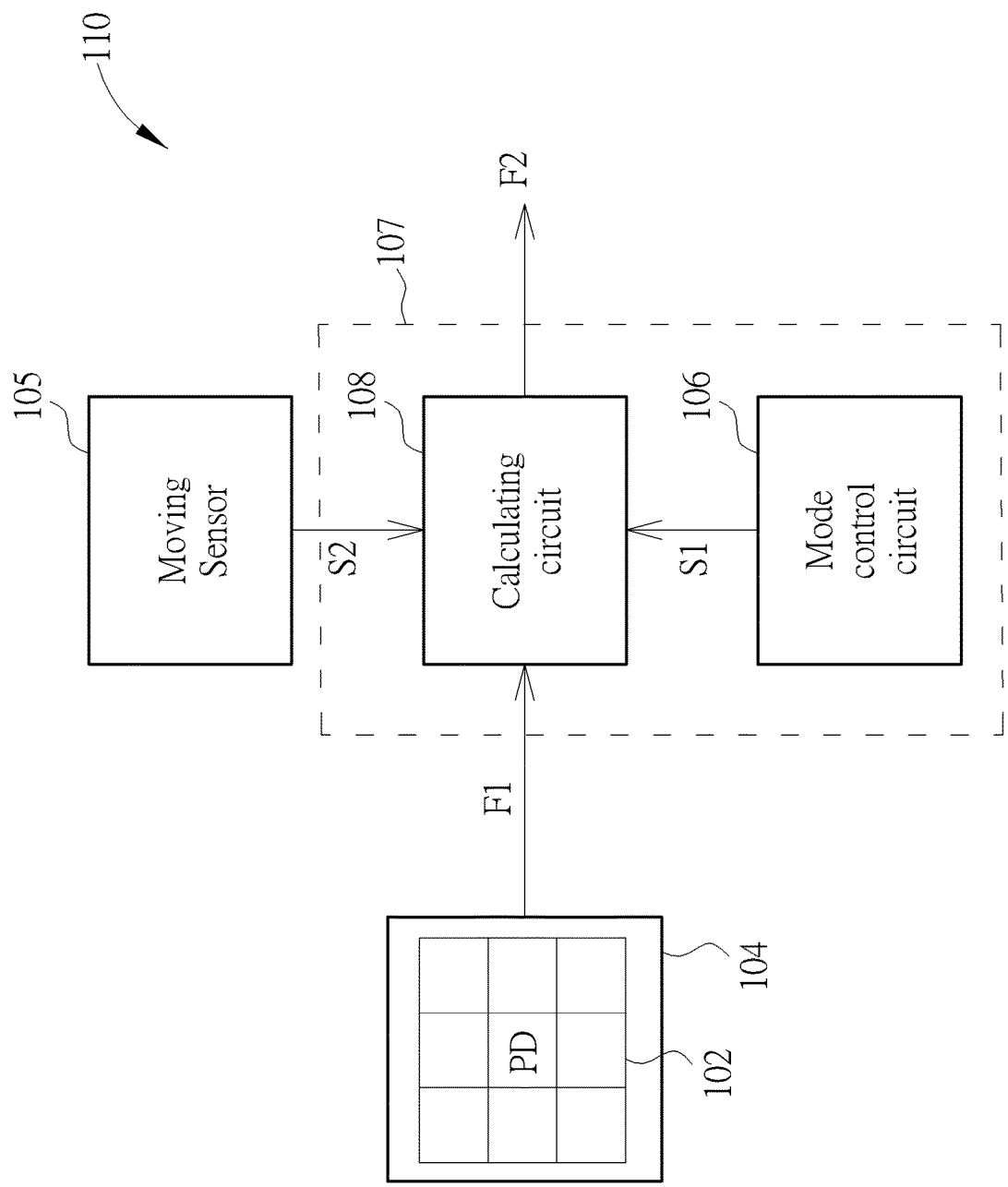
FIG. 2 is a diagram of the image processing apparatus according to an embodiment of the present application.

FIG. 2 illustrates a diagram of the image processing apparatus 110 according to one embodiment of the present application. The image processing apparatus 110 includes the image sensor 104, where the image sensor 104 includes a plurality of photodetectors {PD} to collectively form a pixel array 102. In addition, the image processing apparatus 110 includes the 3D image calculating module 107 and the moving sensor 105. In one embodiment, the 3D image calculating module 107 includes a mode control circuit 106 and a calculating circuit 108. The mode control circuit 106 and the calculating circuit 108 are respectively configured to perform mode control and image calculation. As aforementioned, the 3D image calculating module 107 can be implemented by hardware, software or combination thereof.

The calculating circuit 108 is configured to receive at least one input image frame F1 from the image sensor 104 and receive a mode signal S1 from the mode control circuit 106, and generate and output at least one output image frame F2 according to the at least one input image frame F1 and the mode signal S1. The mode signal S1 may indicate one of a plurality of predetermined modes (e.g., operation modes). The mode control circuit 106 may select a predetermined mode from the plurality of predetermined modes according to one or more settings (e.g., any of default setting, user setting or upper layer setting), to be a selected mode, and control the calculating circuit 108 to operate in accordance with the selected mode through the mode signal S1. Under control of the mode control circuit 106, the mode signal S1 may be configured to control the calculating circuit 108 to perform a predetermined calculation, such as pixel binning or interpolation. According to different mode settings, the resolution of the output frame(s) F2 may be less than, greater than or equal to the resolution of the input frame(s) F1. In one implementation, the input frame(s) F1 may be 3D image(s).

According to some embodiments, at least a portion or all of the photodetectors {PD} inside the image sensor 104 may be implemented by Ge-on-Si technology. More particularly, the pixel array 102 may be divided into two subsets thereof such as two pixel arrays. For example, these two pixel arrays may comprise a non-depth image pixel array 102-1 and a depth image pixel array 102-2. The non-depth image pixel array 102-1 may be configured to generate two-dimensional (2D) image(s) and the depth image pixel array 102-2 may be configured to generate 3D image(s). In one embodiment, the non-depth image pixel array 102-1 is adjacent to the depth image pixel array 102-2; and these two pixel arrays are integrated in a single chip. In one embodiment, these two pixel arrays can be implemented by different chips.

Figure 3:
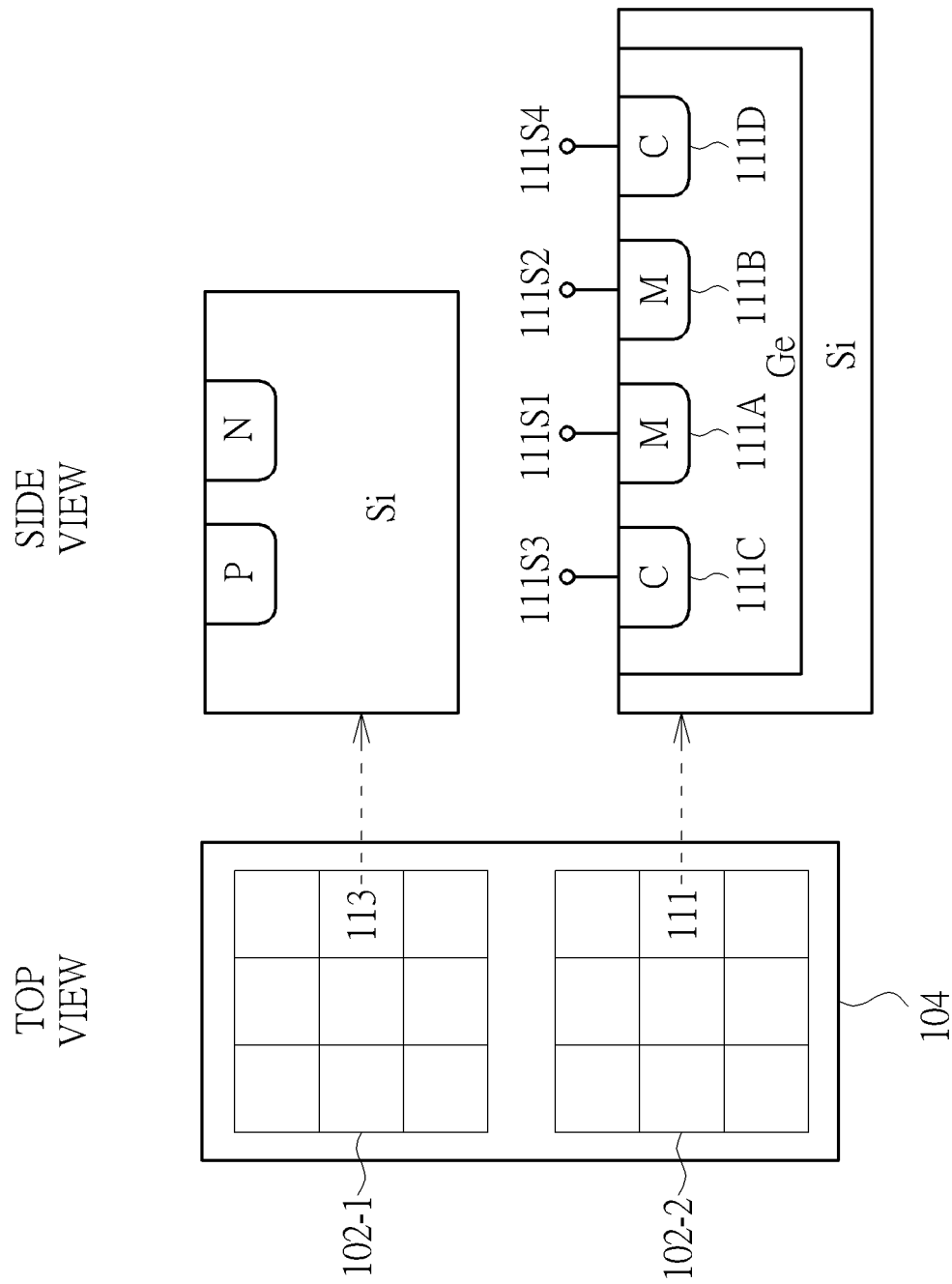
FIG. 3 illustrates a structure of the image sensor according to an embodiment of the present application.

FIG. 3 illustrates a structure of the image sensor 104 according to an embodiment of the present application. The left half and the right half of FIG. 3 are the top-view (TOP VIEW) and side-view (SIDE VIEW) respectively. As illustrated in FIG. 3, any photodetector 113 inside the non-depth image pixel array 102-1 may use silicon to absorb the light, and may comprise a PN junction (not limited to the lateral PN junction in FIG. 3, e.g., it can be a vertical PN junction or something in-between lateral/vertical PN junctions) embedded in the silicon (labeled "Si" in the upper right of FIG. 3 for brevity) to generate photocurrent. In another aspect, any photodetector 111 inside the depth image pixel array 102-2 may use germanium to absorb the light and be configured as a time-of-flight (ToF) photodetector. In one embodiment, the photodetector 111 may comprise modulation regions 111A and 111B and collection regions 111C and 111D (respectively labeled "M" and "C" for brevity). As illustrated in FIG. 3, these four regions 111A, 111B, 111C and 111D are embedded in the germanium (labeled "Ge" for brevity), where the germanium is formed on the silicon (labeled "Si" for brevity). The modulation regions 111A and 111B may be configured to receive the demodulation signals 111S1 and 111S2 to generate the electrical field in the germanium. The photo-carriers (e.g., electrons or holes) will be generated according to the electrical field and be collected by the collection regions 111C and 111D to output the detecting signals 111S3 and 111S4.

In one implementation, the modulation regions 111A and 111B may be doped or un-doped. In the doped scenario, the modulation regions 111A and 111B may be doped with N-type or P-type dopants. In one implementation, the collection regions 111C and 111D may be doped. For example, the collection regions 111C and 111D may be doped with N-type or P-type dopants.

Based on the architecture illustrated in FIG. 3, the non-depth image pixel array 102-1 may use silicon to absorb the light and the depth image pixel array 102-2 may use germanium to absorb the light, and therefore, the image sensor 104 may be regarded as a hybrid image sensor, where the image sensor 104 may utilize silicon absorption for 2D image and germanium absorption for 3D image.

Figure 4:
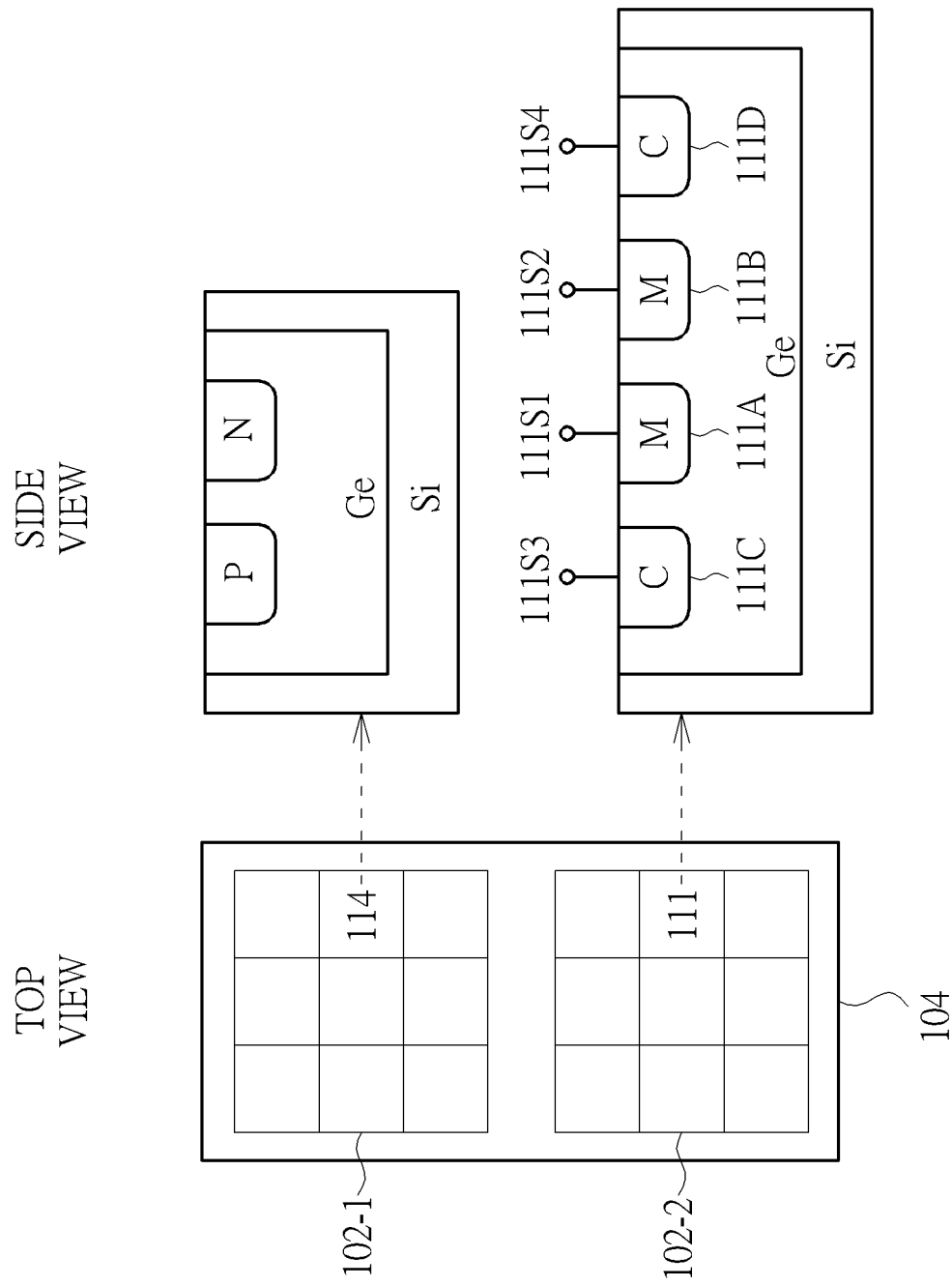
FIG. 4 illustrates a structure of the image sensor according to an embodiment of the present application.

FIG. 4 illustrates a structure of the image sensor 104 according to another embodiment of the present application. The left half and the right half of FIG. 4 are the top-view (TOP VIEW) and side-view (SIDE VIEW) respectively. In comparison with the architecture illustrated in FIG. 3, the non-depth image pixel array 102-1 may be replaced by this embodiment. In response to the replacement in architecture, the relevant numeral is renumbered (e.g., "113" may be replaced by "114" in this embodiment). As illustrated in FIG. 4, the non-depth image pixel array 102-1 may be implemented by using the Ge-on-Si technology to absorb the light as well, where any photodetector 114 inside the non-depth image pixel array 102-1 of this embodiment may comprise the germanium (labeled "Ge" for brevity) formed on the silicon (labeled "Si" for brevity), and may comprise a PN junction (not limited to the lateral PN junction in FIG. 4, e.g., it can be a vertical PN junction or something in-between lateral/vertical PN junctions) embedded in the Ge and/or Si to generate photocurrent.

Figure 5:
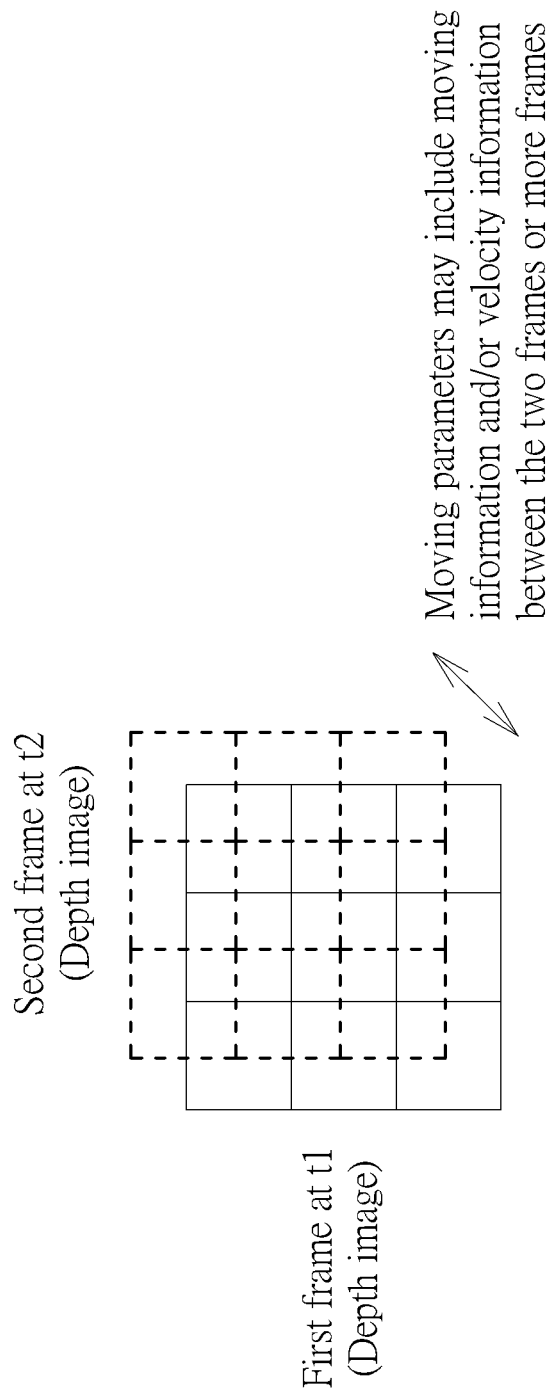
FIG. 5 illustrates image frames detected by the image sensor at different time points according to an embodiment of the present application.

FIG. 5 illustrates image frames detected by the image sensor 104 at different time points t1 and t2 according to an embodiment of the present application. As the moving (e.g., a vibration caused by hand) may occur while the image sensor 104 is capturing images, the image sensor 104 may generate image frame(s) F1, such as a first frame (e.g., a first depth image) generated at the time point t1 and a second frame (e.g., a second depth image) generated at the time point t2. In addition, the moving sensor 105 may perform motion sensing to generate the motion sensing results, and more particularly, may generate at least one moving parameter S2 to the 3D image calculating module 107 according to the distance/velocity information between at least two image frames F1 (e.g., the first and the second frames). In other words, the moving parameter(s) S2 may include moving information and/or velocity information between these image frames (e.g., the first and the second frames). Based on the distance/velocity information and received image frames F1, the calculating circuit 108 can generate at least one output frame F2 (e.g., an output depth image generated by combining at least one portion of the first and the second depth images) with higher resolution/quality than the image frames F1.

Figure 6A:
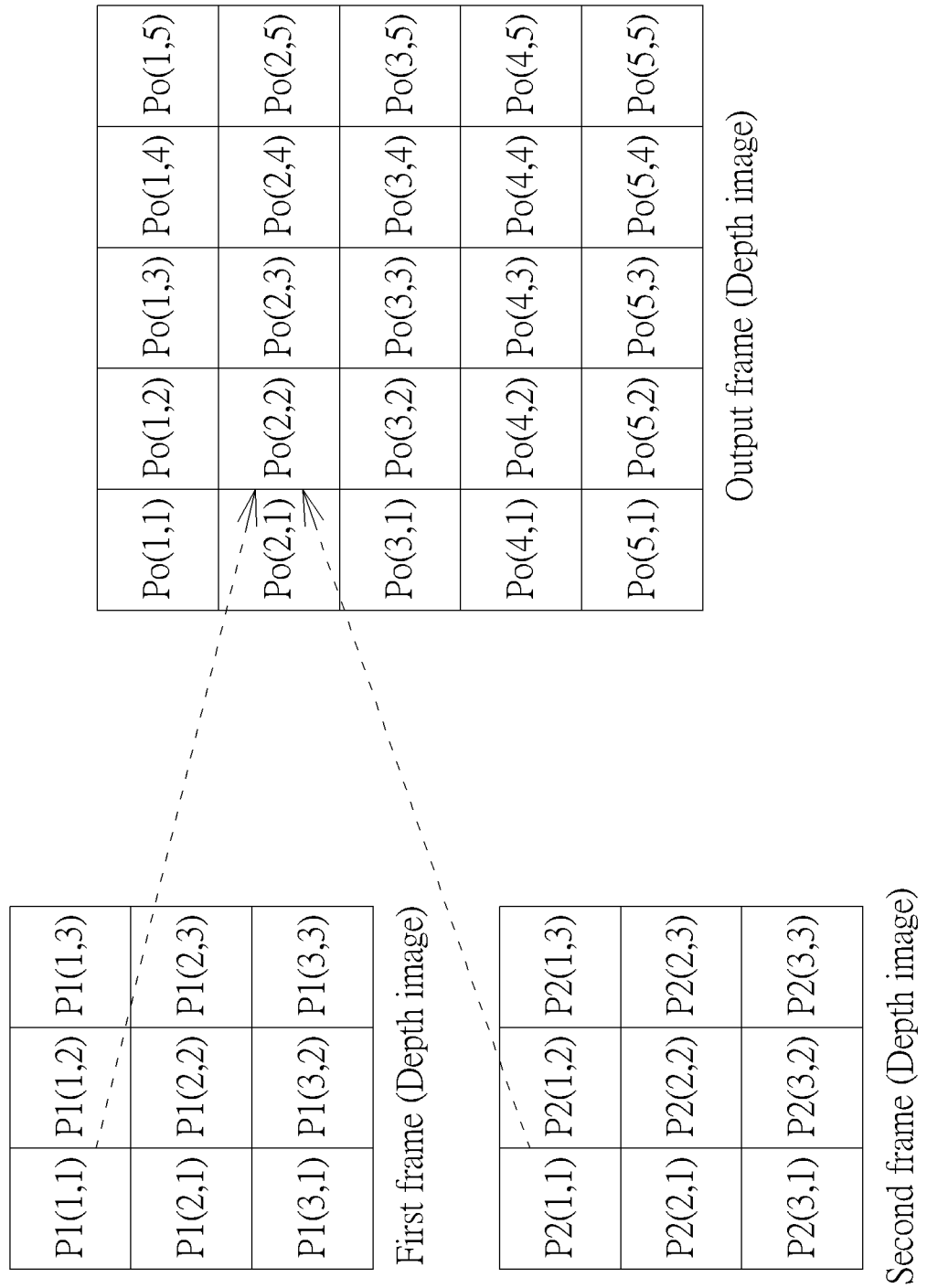
FIG. 6A illustrates a calculation method for processing image frames according to an embodiment of the present application.

FIG. 6A illustrates a calculation method for processing image frames according to an embodiment of the present application. This calculation method can be performed by the calculating circuit 108. As illustrated in FIG. 6A, the first frame (e.g., the first depth image) has multiple pixel values such as {P1(1,1), ..., P1(3,3)}, the second frame (e.g., the second depth image) has multiple pixel values such as {P2(1,1), ..., P2(3,3)}, and the output frame (e.g., the output depth image) has multiple pixel values such as {Po(1,1), ..., Po(5,5)}, where each pixel value of the first frame, the second frame and the output frame may be an image depth value. During operation, the calculating circuit 108 may derive the pixel values of the output frame (e.g., any of {Po(1,1), ..., Po(5,5)}) according to one or more pixel values of the first frame and one or more pixel values of the second frame. For example, the calculating circuit 108 may derive the pixel value Po(2,2) according to the pixel value P1(1,1), the pixel value P2(1,1), and the weighting values W1 and W2, as Equation (A) below:

$$Po(2,2)=P1(1,1)*W1+P2(1,1)*W2 \quad (A)$$

The weighting values W1 and W2 can be determined based on the moving information. Specifically, the calculating circuit 108 may determine the first and the second weighting values W1 and W2 according to the moving parameter(s) S2 generated by the moving sensor 105.

According to some embodiments, the moving information may indicate the unintentional hand vibration of the electronic system 100, which can be expressed with a vibration parameter. In this scenario, the moving parameter(s) S2 generated by the moving sensor 105 may include a vibration parameter. The calculating circuit 108 may determine the first and the second weighting values W1 and W2 according to the moving parameter(s) S2 including the vibration parameter. For example, if the vibration parameter indicating the vibration is greater than a predetermined value, the second weighting value W2 can be greater than the first weighting value W1; if the vibration parameter indicating the vibration is less than the predetermined value, the second weighting value W2 can be set less than the first weighting value W1; and if the vibration parameter indicating the vibration is equal to the predetermined value, meaning the first frame and the second frame are equally important, the second weighting value W2 can be set equal to the first weighting value W1.

Figure 6B:
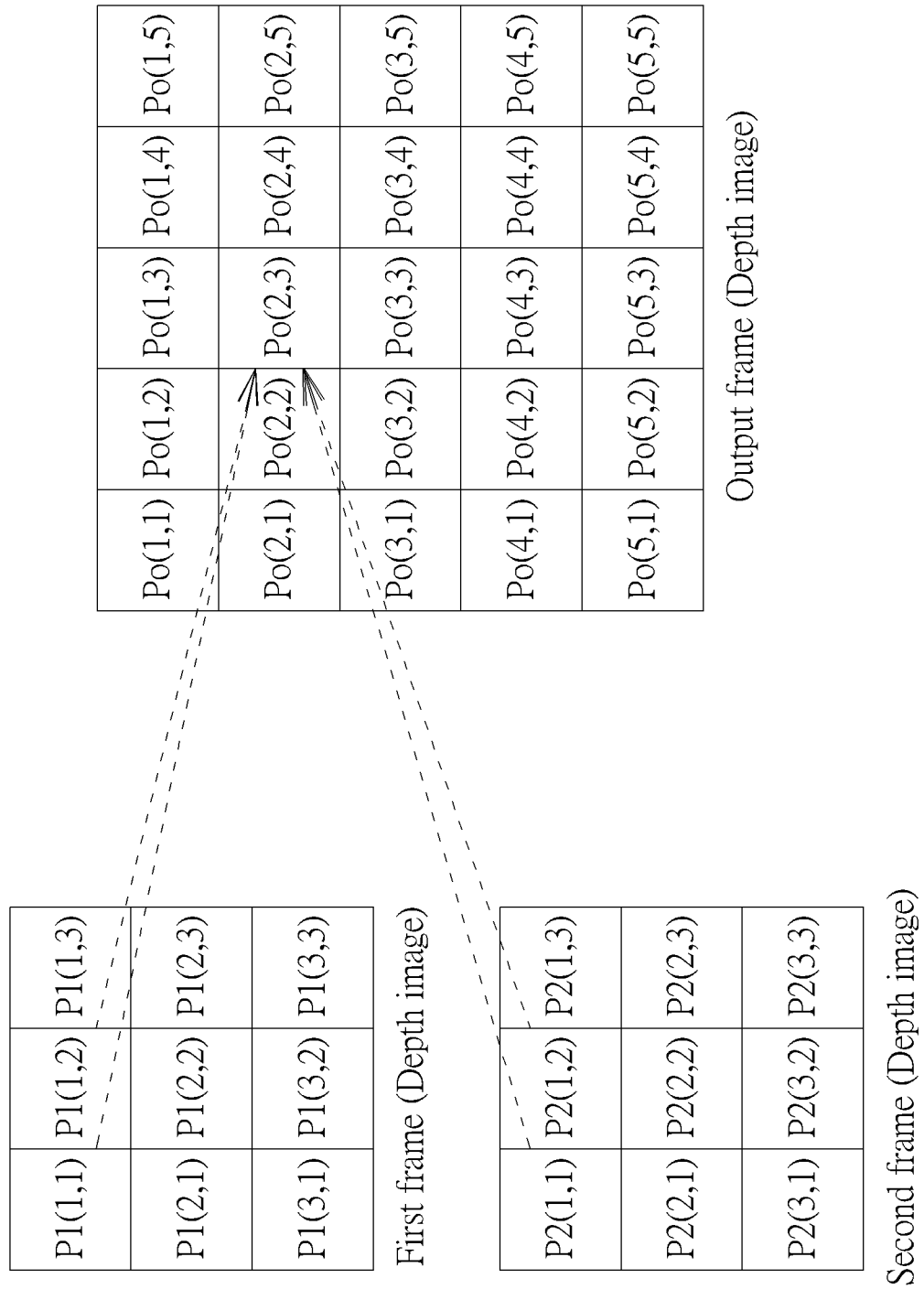
FIG. 6B illustrates a calculation method for processing image frames according to an embodiment of the present application.

FIG. 6B illustrates a calculation method for processing the image frames according to another embodiment of the present application. In this embodiment, two or more pixel values of the first frame and two or more pixel values of the second frame are calculated to derive a single pixel value of the output frame. For example, the calculating circuit 108 may derive the pixel value Po(2,3) according to the pixel value P1(1,1), the pixel value P1(1,2), the pixel value P2(1,1), the pixel value P2(1,2), and the corresponding weighting values W1, W2, W1' and W2', as Equation (B) below:

$$Po(2,3)=P1(1,1)*W1+P2(1,1)*W2+P1(1,2)*W1'+P2(1,2)*W2' \quad (B)$$

The weighting values W1, W2, W1' and W2' can be determined in ways similar to those discussed above with respect to the embodiments discussed in FIG. 6A. The repeated descriptions are hereby omitted.

In some embodiments, more than four pixels can be used, depending on the moving information. For example, if the moving information indicates that the second frame is caused by an unintentional movement, the number of pixels from the second frame can be smaller than the number of pixels from the first frame. On the other hand, if the moving information indicates that the second frame is caused by an intentional movement, the number of pixels from the second frame can be larger than the number of pixels from the first frame.

In addition to using the movement to obtain high resolution and/or quality image frame, the present application also provides other approaches, including but not limit to binning and interpolation, to obtain high resolution and/or quality image frame. The relevant embodiments will be described below.

The mode control circuit 106 is capable of controlling the calculation modes of the calculating circuit 108. The following embodiments disclose a plurality of calculation modes, including but not limit to non-overlapping binning in spatial domain (using Mode(1) as representative hereinafter), non-overlapping binning in time domain (using Mode(2) as representative hereinafter), overlapping binning in spatial domain (using Mode(3) as representative hereinafter), interpolation (using Mode(4) as representative hereinafter), to improve image quality or resolution.

Figure 7A:
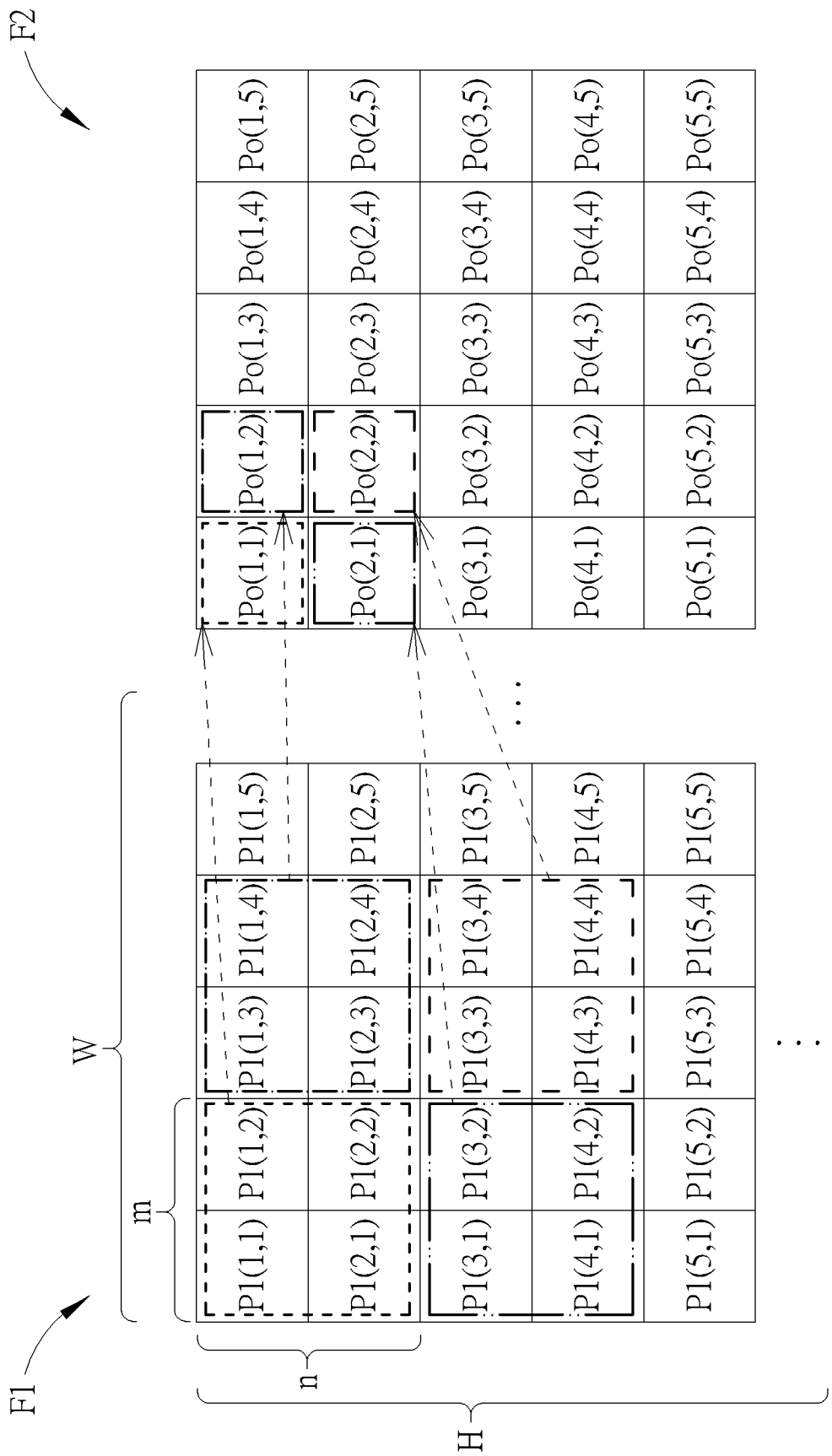
FIG. 7A illustrates a calculation method for processing image frame according to an embodiment of the present application.

FIG. 7A illustrates a calculation method for processing image frame according to an embodiment of the present application. In this embodiment, the calculation method is operated under Mode(1). More particularly, a sub-mode Mode(1A) is applied, which performs non-overlapping binning in spatial domain with fixed-range binning cluster. As illustrated in FIG. 7A, the resolution of the input frame F1 could be W×H and the range of the binned cluster could be m×n. In other words, the dimensions of the binned clusters are the same. The binned cluster is not overlapping to each other. In addition, m and n represent positive integers, respectively, where at least one of them is greater than one; and W and H represent positive integers, respectively, and are greater than m and n, respectively. Under this calculation method, the calculating circuit 108 may obtain any output pixel of the output frame F2 from a binned cluster in the input frame F1.

For clear understanding, below descriptions use a symbol to represent a pixel location. For example, the calculating circuit 108 may obtain an output pixel such as Po(1,1) from a binned cluster such as {P1(1,1), P1(1,2), P1(2,1), P1(2,2)}, obtain another output pixel such as Po(1,2) from another binned cluster such as {P1(1,3), P1(1,4), P1(2,3), P1(2,4)}, and the rest output pixels can be obtained through similar manner. In one implementation, the calculating circuit 108 can calculate an average value of any binned cluster such as {P1(1,1), P1(1,2), P1(2,1), P1(2,2)} to obtain an output pixel such as Po(1,1). In one implementation, the calculating circuit 108 can provide different weightings to different pixels of the binned cluster.

Figure 7B:
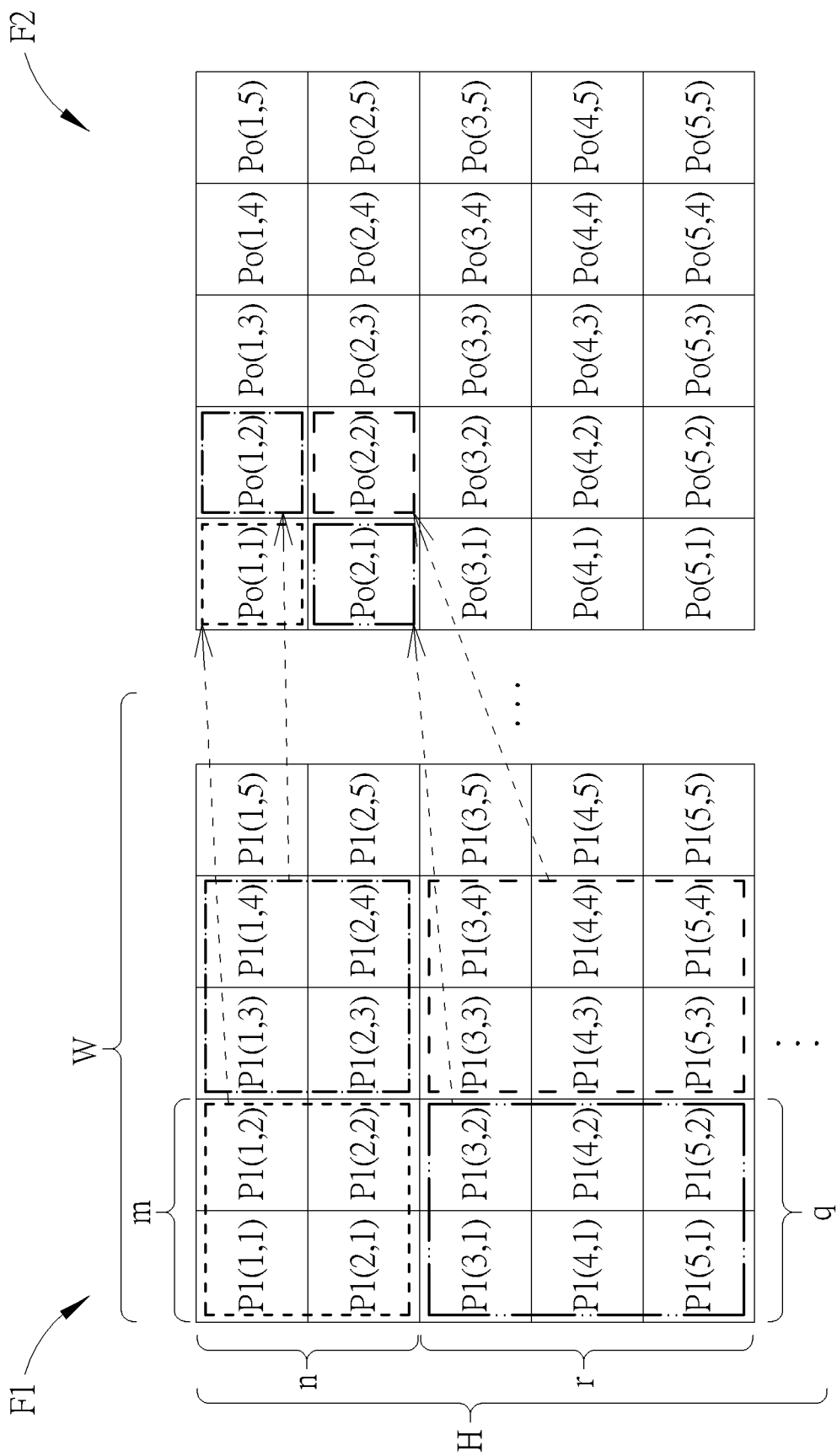
FIG. 7B illustrates a calculation method for processing image frame according to an embodiment of the present application.

FIG. 7B illustrates a calculation method for processing image frame according to an embodiment of the present application. In this embodiment, the calculation method is operated under Mode(1). More particularly, a sub-mode Mode(1B) is applied, which performs non-overlapping binning in spatial domain with non-fixed-range binning cluster. In comparison with the spatial binning calculation illustrated in FIG. 7A, the ranges of the binned clusters could be different from each other. For example, some output pixels (e.g., Po(1,1), Po(1,2)) may be obtained from a first range m×n (e.g., 2×2) of the input frame F1, and some output pixels (e.g., Po(2,1), Po(2,2)) may be obtained from a second range q×r (e.g., 2×3) of the input frame F1, where q and r represent positive integers, respectively and at least one of them is greater than one.

Figure 7C:
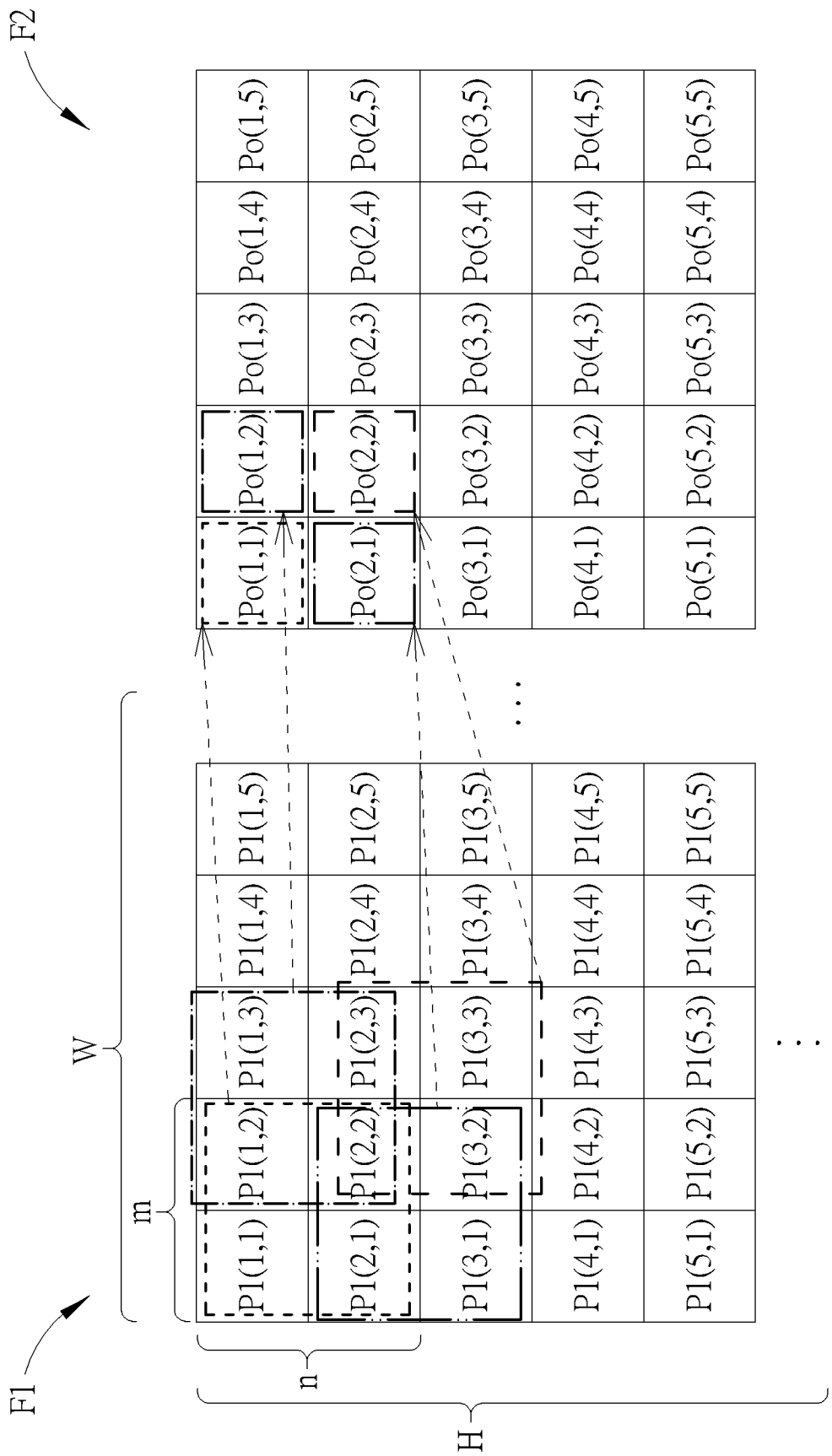
FIG. 7C illustrates a calculation method for processing image frame according to an embodiment of the present application.

FIG. 7C illustrates a calculation method for processing image frame according to an embodiment of the present application. In this embodiment, the calculation method is operated under Mode(3), which performs overlapping binning in spatial domain. In comparison with the embodiments illustrated in FIGS. 7A-7B, the calculation method performed by the calculating circuit 108 in this embodiment is an overlapping binning calculation. As illustrated in FIG. 7C, the resolution of the input frame F1 may be W×H, the range of the binned cluster may be m×n, and the binned clusters are partially overlapping to each other. For example, the calculating circuit 108 may obtain an output pixel such as Po(1,1) based on a binned cluster such as {P1(1,1), P1(1,2), P1(2,1), P1(2,2)}, obtain another output pixel such as Po(1,2) based on another binned cluster such as {P1(1,2), P1(1,3), P1(2,2), P1(2,3)}, and the rest output pixels may be obtained through similar manner. In one implementation, the calculating circuit 108 can calculate an average value of any binned cluster such as {P1(1,1), P1(1,2), P1(2,1), P1(2,2)} to obtain an output pixel such as Po(1,1). In one implementation, the calculating circuit 108 can provide different weightings to different pixels of the binned cluster.

Figure 8:
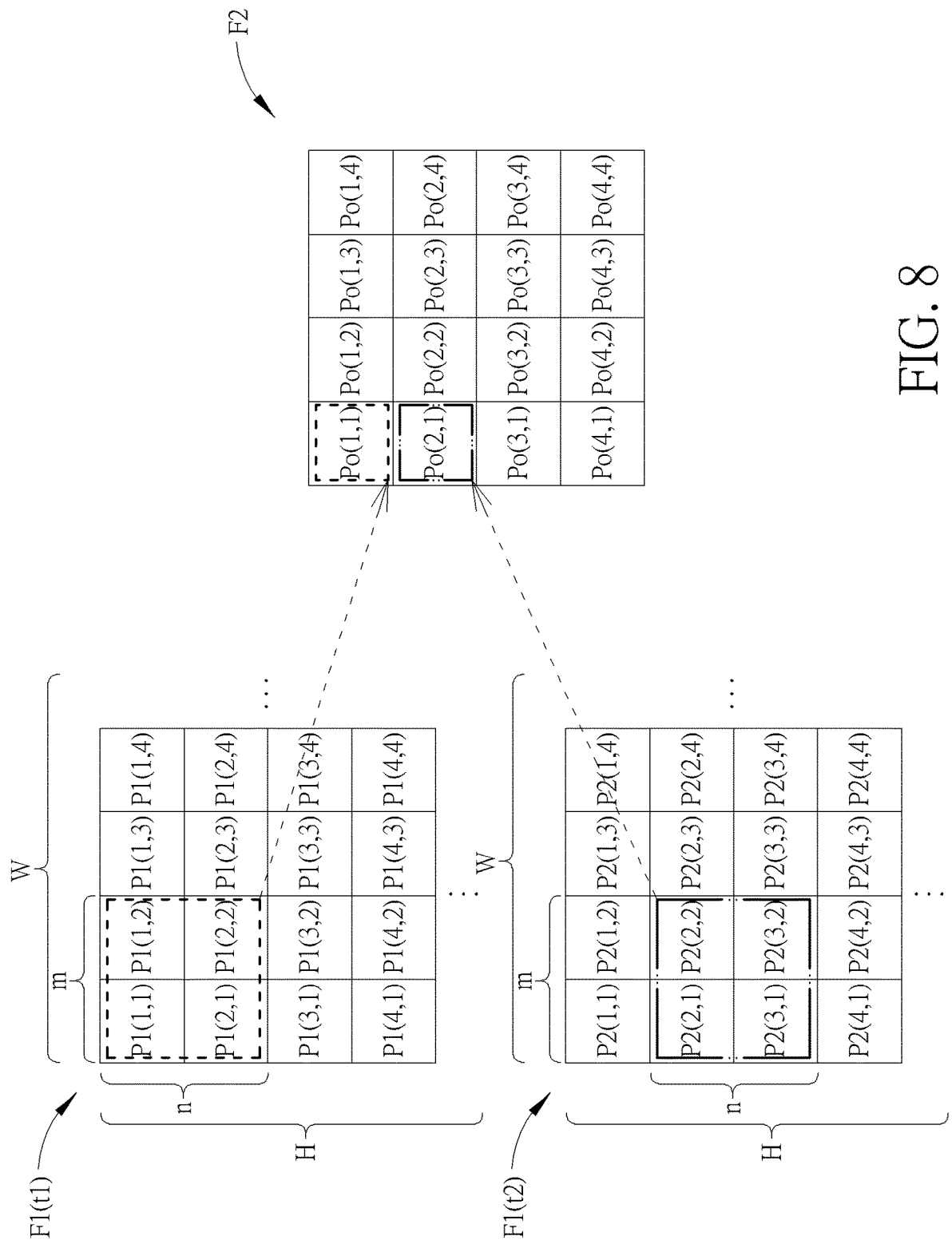
FIG. 8 illustrates a calculation method for processing image frame according to an embodiment of the present application.

FIG. 8 illustrates a calculation method for processing image frame according to an embodiment of the present application. In this embodiment, the calculation method is operated under Mode(2), which performs non-overlapping binning in time domain. In comparison with the embodiments illustrated in FIGS. 7A-7C, the calculation method performed by the calculating circuit 108 in this embodiment is a non-overlapping binning on different input frames {F1} (e.g., the first input frame F1(t1) generated at the time point t1 and the second input frame F1(t2) generated at the time point t2). The resolution of input frames {F1} may be W×H and the range of each binned cluster may be m×n. For the first input frame F1(t1), the calculating circuit 108 may obtain an output pixel such as Po(1,1) based a binned cluster such as {Po(1,1), Po(1,2), Po(2,1), Po(2,2)}; for the second input frame F1(t2), the calculating circuit 108 may obtain another output pixel such as Po(2,1) based on another binned cluster such as {P2(2,1), P2(2,2), Po(3,1), Po(3,2)}; and the rest output pixels may be obtained through similar manner.

Figure 9:
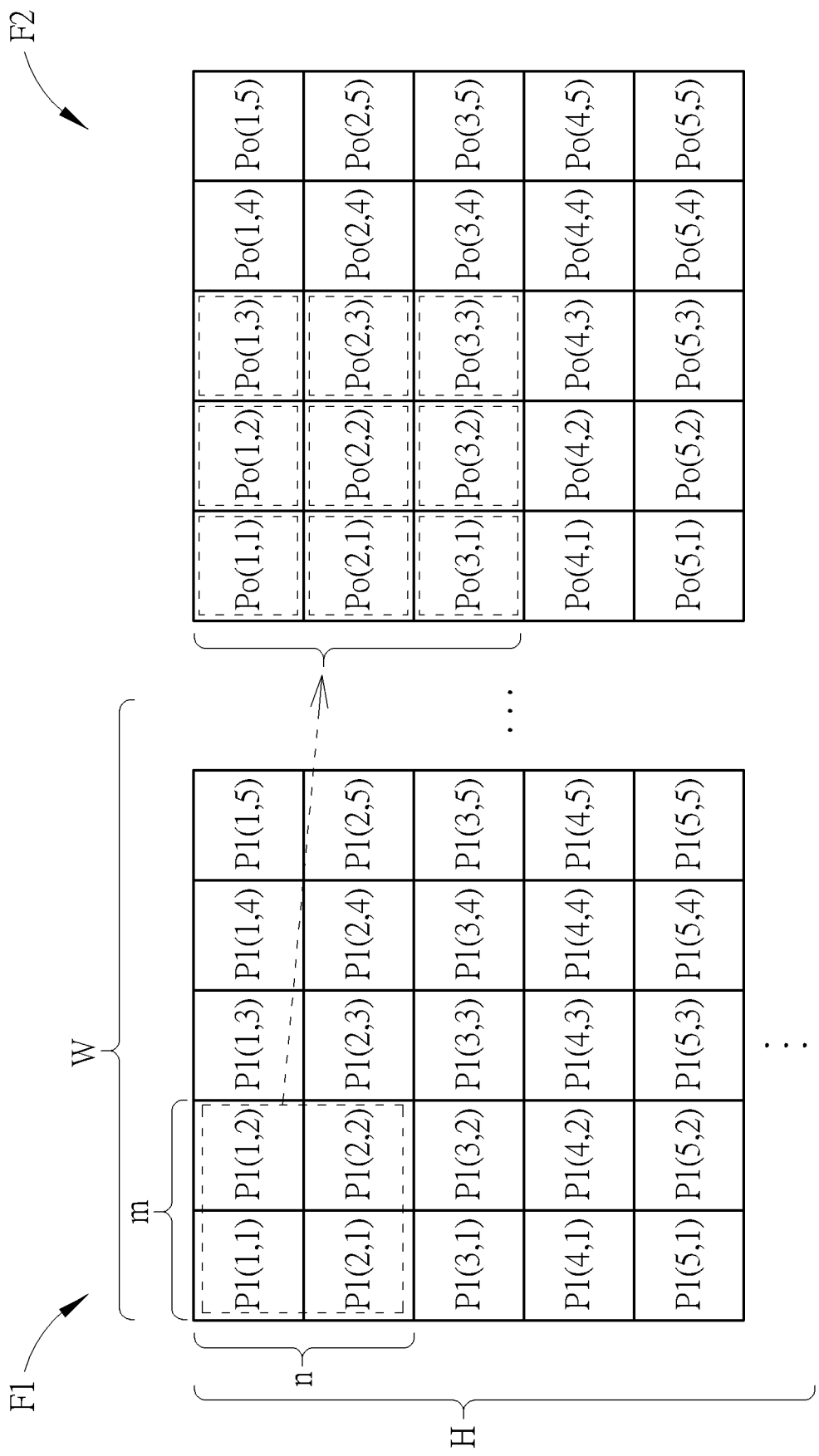
FIG. 9 illustrates a calculation method for processing image frame according to an embodiment of the present application.

FIG. 9 illustrates a calculation method for processing image frame according to an embodiment of the present application. In this embodiment, the calculation method is operated under Mode(4), which performs interpolation calculation. As illustrated in FIG. 9, the calculating circuit 108 may transform the input frame F1 to the output frame F2 with a higher resolution by interpolation. For example, the calculating circuit 108 may obtain any output pixel of the output frame F2 based on Equation (C) below:

$$P_{o(I,J)}=\Sigma_{(i,j)\in A(I,J)}w_{(i,j)}p_{1(i,j)} \qquad (C)$$

According to Equation (C), the calculating circuit 108 may obtain the output pixel $P_{o\,(I,\,J)}$ from a weighted sum of the selected input pixels $\{P_{1\,(i,\,j)}\}$. According to some embodiments, this computation can be performed on the 3D image (e.g., the input frame F1) generated from the depth image pixel array 102-2. More particularly, the signal-to-noise ratio (SNR) can be improved and the frame rate can be maintained.

According to some embodiments, the calculating circuit 108 may perform additional interpolation on the input frame(s) generated under other modes (e.g., Mode(1), Mode(2), and/or Mode(3)), and/or input frame(s) generated based on the movement as described above, to generate a higher plane/depth resolution and quality frames.

According to some embodiments, the calculating circuit 108 may arbitrarily combine overlapping binning, non-overlapping binning, fixed or dynamic clustering, interpolation, spatial domain calculation and/or time domain calculation to be the aforementioned predetermined calculation performed by the calculating circuit 108.

Figure 10:
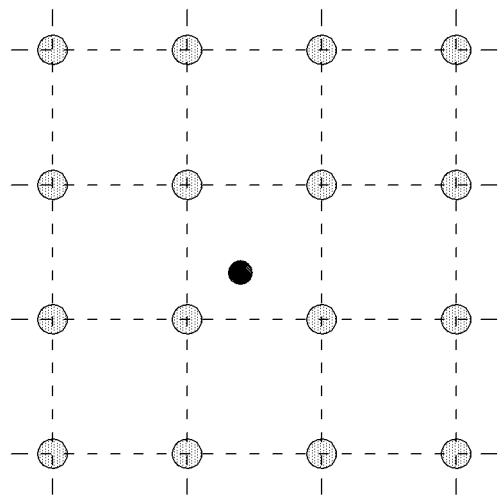
FIG. 10 illustrates some implementations of binning/interpolation calculations according to some embodiments of the present application.
Figure 10:
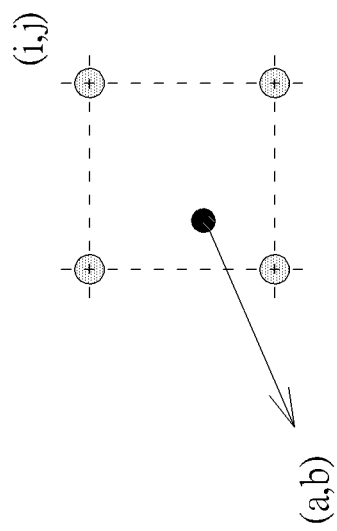

FIG. 10 illustrates some implementations of binning/interpolation calculations according to some embodiments of the present application. The spots arranged at intersections of grid lines (depicted with dashed lines) may represent the locations of at least one portion of the input pixels $\{P_1\}$; and the heavily shaded spot depicted in the left half and the right half of FIG. 10 may represent the location of a certain output pixels $P_o$. As illustrated in the left half of FIG. 10, the location of a certain input pixel can be labeled as (i, j) and the location of a certain output pixel can be labeled as (a, b).

In the case of binning calculation, the calculating circuit 108 may apply a common setting to the weighting values $\{w_{(i,\,j)}\}$. More particularly, the calculating circuit 108 may set all of the weighting values $\{w_{(i,\,j)}\}$ to be the same, such as an averaging coefficient $1/|A(I, J)|$. For example, the calculating circuit 108 may set weighting value $w_{(i,\,j)}$ based on Equation (D) as below:

$$w_{(i,\,j)}=f(a_{(i,\,j)}) \qquad (D);$$

where $a_{(i,\,j)}$ represents the amplitude at pixel $P_{1\,(i,\,j)}$.

In the case of interpolation calculation, the output pixels and input pixels are usually transformed into a common coordinate. As a simplest case, taking the left half of FIG. 10 as an example, the weighting values may be calculated by bilinear interpolation. Assuming (a, b) is the coordinate of $P_{o\,(I,\,J)}$ mapped into the coordinate of the input frame F1, A(I, J) may represent the vertices of the smallest rectangle containing (a, b) and $w_{(i,\,j)}=(1-|a-i|)*(1--|b-j|)$. According to some embodiments, taking the right half of FIG. 10 as an example, A(I, J) may represent the nearby m×n pixels of (a, b) and $c_{(i,\,j)}=(1/Z)*f(i-a)*f(j-b)$, where Z is a normalization constant. As a result, the final weighting value $w_{(i,\,j)}$ can be expressed with $c_{(i,\,j)}$ (e.g., $w_{(i,\,j)}=c_{(i,\,j)}$). According to some embodiments, the calculating circuit 108 may use a weighted median filter with $c_{(i,\,j)}$. In this scenario, if it is the filtered out pixel, the weighting value $w_{(i,\,j)}$ of (i, j) is equal to 1. Otherwise, the weighting value $w_{(i,\,j)}$ of (i, j) is equal to 0.

Based on the apparatus and image calculation method disclosed above, some embodiments may be implemented. The image sensor 104 may be configured to absorb light to generate the input frame F1, and the calculating circuit 108 may be configured to generate the output frame F2 according to a predetermined calculation. More particularly, the mode control circuit 106 may be configured to generate the mode signal S1, for being output to the calculating circuit 108, to control which predetermined calculation being performed by the calculating circuit 108. In addition, the photodetectors {111} may use a material including germanium (e.g., $Si_xGe1-x$, where $0\le x<1$) to absorb the light, and the predetermined calculation may include pixel binning, interpolation, movement or any combination thereof.

According to some embodiments, the photodetectors {113} inside the image sensor 104 may use a material including silicon to absorb the light. According to some embodiments, the photodetectors {113} inside the image sensor 104 may use a material including germanium to absorb the light.

According to some embodiments, the predetermined calculation performed by the calculating circuit 108 can be changed based on different modes (e.g., the Mode(1), Mode (2) or any other modes).

The image calculation performed by the calculating circuit 108 is frame-based calculation, and those frames can be regarded as information, either in time or location, for the image processing apparatus 110 or the electronic system 100. For example, the first frame F1(1) and the second frame F1(2) may respectively represent the first set of input information at the first time (e.g., the time point t1) and the second set of input information at the second time (e.g., the time point t2); and the output frame F2 may represent the output information generated based on these two sets of input information. For another example, the first frame F1(1) and the second frame F1(2) may respectively represent the first set of input information at the first location (e.g., the location RRL1) and the second set of input information at the second location (e.g., the location RRL2); and the output frame F2 may represent the output information generated based on these two sets of input information.

Figure 11:
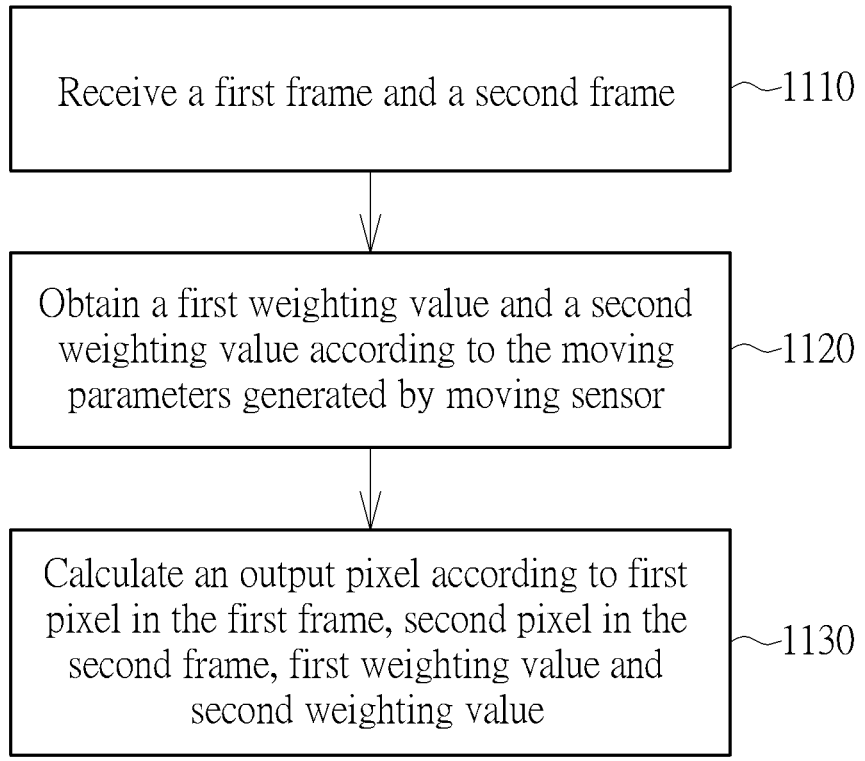
FIG. 11 illustrates a flowchart of a calculation method for processing the image frame according to an embodiment of the present application.

FIG. 11 illustrates a flowchart of a calculation method for processing the image frame according to an embodiment of the present application. According to some embodiments, the calculating circuit 108 can perform the calculation method based on this flowchart.

In Step 1110, the calculating circuit 108 may receive the first frame F1(1) and the second frame F1(2).

In Step 1120, the calculating circuit 108 may obtain the first weighting value W1 and the second weighting value W2 according to the one or more moving parameters S2 generated by the moving sensor 105.

In Step 1130, the calculating circuit 108 may calculate an output pixel Po according to a first pixel P1 in the first frame F1(1), a second pixel P2 in the second frame F1(2), the first weighting value W1 and the second weighting value W2.

According to this embodiment, the first pixel P1 in the first frame F1(1), the second pixel P2 in the second frame F1(2), and the output pixel Po in the output frame F2 may be depth values.

Figure 12:
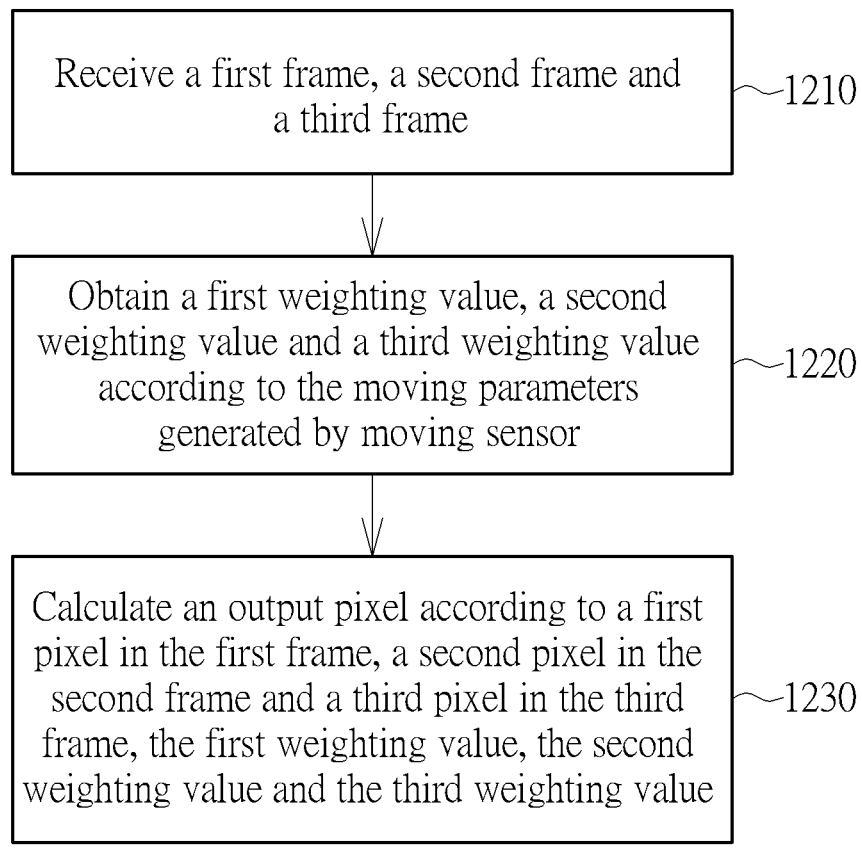
FIG. 12 illustrates a flowchart of a calculation method for processing the image frame according to an embodiment of the present application.

FIG. 12 illustrates a flowchart of a calculation method for processing the image frame according to an embodiment of the present application. According to some embodiments, the calculating circuit 108 can perform the calculation method based on this flowchart.

In Step 1210, the calculating circuit 108 may receive the first frame F1(1), the second frame F1(2) and a third frame F1(3).

In Step 1220, the calculating circuit 108 may obtain the first weighting value W1, the second weighting value W2 and a third weighting value W3 according to the one or more moving parameters S2 generated by the moving sensor 105.

In Step 1230, the calculating circuit 108 may calculate an output pixel Po according to a first pixel P1 in the first frame F1(1), a second pixel P2 in the second frame F1(2) and a third pixel P3 in the third frame F1(3), the first weighting value W1, the second weighting value W2 and the third weighting value W3.

According to this embodiment, the first pixel P1 in the first frame F1(1), the second pixel P2 in the second frame F1(2), the third pixel P3 in the third frame F1(3), and the output pixel Po in the output frame F2 may be depth values. In comparison with the embodiment illustrated in FIG. 11, the image processing apparatus 110 may use three input frames (e.g., the frames F1(1), F1(2), and F1(3)) to generate an output frame.

Figure 13:
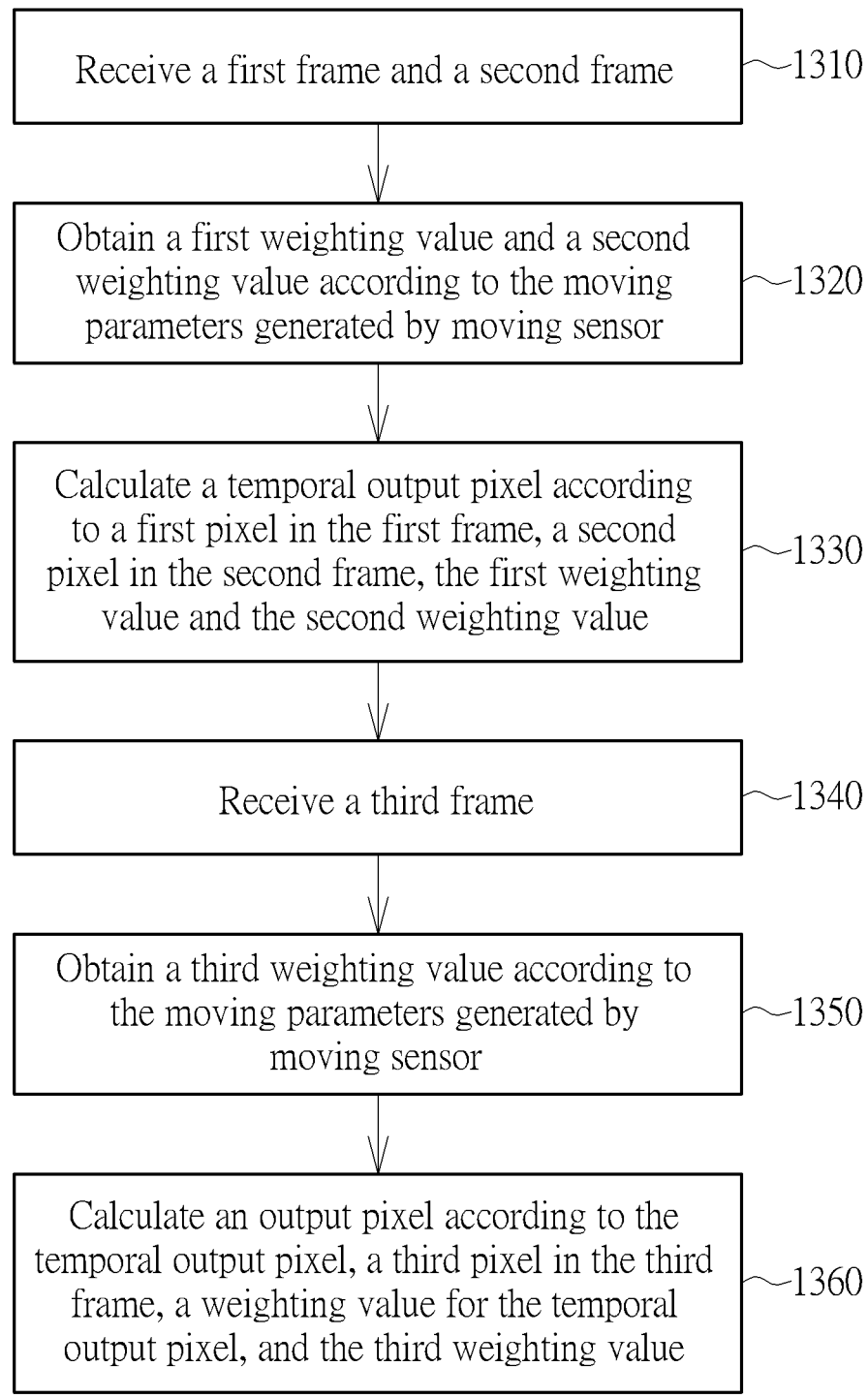
FIG. 13 illustrates a flowchart of a calculation method for processing the image frame according to an embodiment of the present application.

FIG. 13 illustrates a flowchart of a calculation method for processing the image frame according to an embodiment of the present application. According to some embodiments, the calculating circuit 108 can perform the calculation method based on this flowchart.

In Step 1310, the calculating circuit 108 may receive the first frame F1(1) and the second frame F1(2).

In Step 1320, the calculating circuit 108 may obtain the first weighting value W1 and the second weighting value W2 according to the one or more moving parameters S2 generated by the moving sensor 105.

In Step 1330, the calculating circuit 108 may calculate a temporal output pixel Po_temp in a temporal output frame F_temp according to a first pixel P1 in the first frame F1(1), a second pixel P2 in the second frame F1(2), the first weighting value W1 and the second weighting value W2.

In Step 1340, the calculating circuit 108 may receive the third frame F1(3).

In Step 1350, the calculating circuit 108 may obtain the third weighting value W3 according to the one or more moving parameters S2 generated by the moving sensor 105.

In Step 1360, the calculating circuit 108 may calculate an output pixel Po according to the temporal output pixel Po_temp, a third pixel P3 in the third frame F1(3), a weighting value W_temp for the temporal output pixel Po_temp, and the third weighting value W3. For example, the operations of Steps 1310-1330 may be equivalent to that of Steps 1110-1130, respectively, the temporal output pixel Po_temp may be equal to the output pixel Po of Step 1330, and the weighting value W_temp may make the output pixel Po of Step 1360 be equal to the output pixel Po of Step 1230.

According to this embodiment, the first pixel P1 in the first frame F1(1), the second pixel P2 in the second frame F1(2), the third pixel P3 in the third frame F1(3), and the output pixel Po in the output frame F2 may be depth values. In comparison with the embodiment illustrated in FIG. 11, the image processing apparatus 110 may use three input frames (e.g., the frames F1(1), F1(2), and F1(3)) to generate an output frame. More particularly, the calculating circuit 108 may generate the temporal output frame F_temp according to two input frames (e.g., the frames F1(1) and F1(2)) and then generate the output frame F2 based on the third input frame (e.g., the frame F1(3)) and the temporal output frame F_temp.

According to the embodiments illustrated in FIGS. 11-13, the weighing values are obtained according to the moving sensor 105, however, it is not a limitation. In some other embodiments, these weight values can be obtained according to other factors, such as the calculation circuit 108 directly sets these weighting values to proceed with the binning/interpolation calculations.

Foregoing embodiments disclose at least movement calculation, binning calculation and interpolation calculation, applying to the image sensor 104 having Ge-on-Si technology, so that the image resolution and quality can be improved. In addition, as the defects of the image sensor 104 may exist, the present application discloses other embodiments below, which integrate calibration mechanisms to increase the image accuracy.

Figure 14:
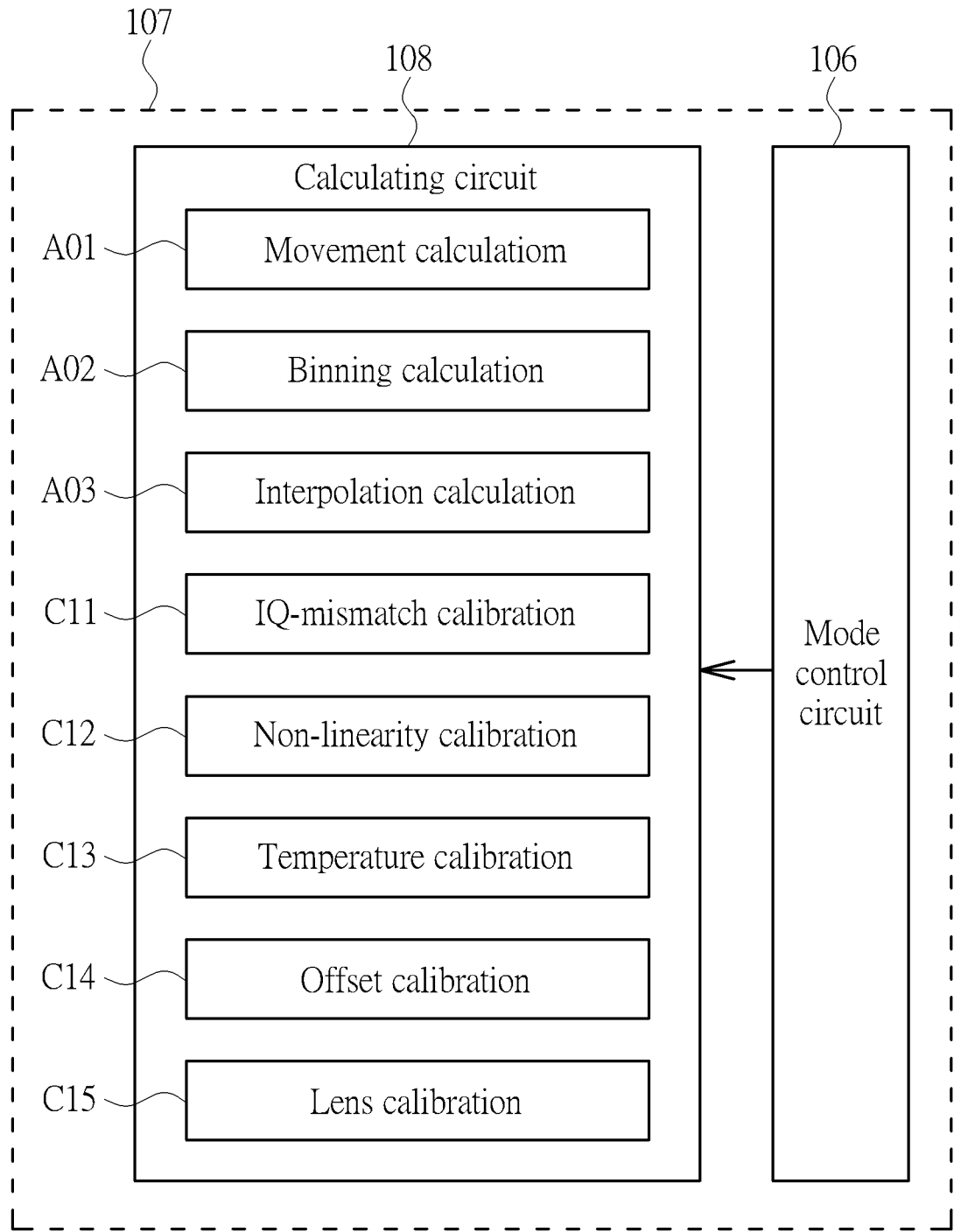
FIG. 14 illustrates a 3D image calculating module according to an embodiment of the present application.

FIG. 14 illustrates a 3D image calculating module according to an embodiment of the present application. The movement calculation A01 can refer to the embodiments illustrated in FIGS. 2, 5, 6 and 11-13. The binning calculation A02 can refer to the embodiments illustrated in FIGS. 7, 8 and 10. The interpolation calculation A03 can refer to the embodiments illustrated in FIGS. 9 and 10. More particularly, this embodiment integrates calibration mechanisms into the calculating circuit 108, including but not being limited to In-phase and Quadrature (IQ)-mismatch calibration C11, non-linearity calibration C12, temperature calibration C13, offset calibration C14 and lens calibration C15. These calibrations can be implemented by a look-up-table (LUT), and its calibration data can be stored in a storage medium (e.g., register or flash memory).

According to some embodiments, the output information (e.g. the output frame F2) can be generated at least partially based on one or any combination of a binning calculation, interpolation calculation and a calibration. For example, the orders of performing these calculations A01, A02, A03 and calibrations C11, C12, C13, C14 and C15 can be properly adjusted and not all items need to be performed. In one embodiment, the orders and items can be performed by the calculating circuit 108 as {A02, A03, C11, C12, C13, C14 and C15}. In another embodiment, the orders and items can be performed by the calculating circuit 108 as {C11, A02, C12, C13, and C14}. As many combinations of the orders and items can be implemented, other embodiments are not illustrated herein for brevity. In other regards, the mode control circuit 106 can dynamically adjust these operations.

With calibration mechanisms integrated into the 3D image calculating module 107 in connection with movement, binning and/or interpolation calculations, as a result, the image resolution, quality and accuracy can be improved.

Figure 15:
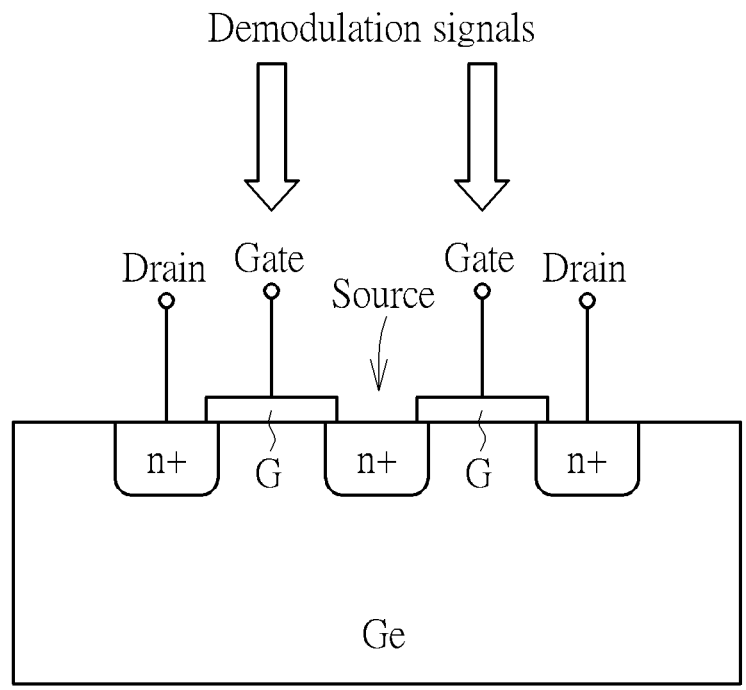
FIG. 15 illustrates a structure of a photodetector according to an embodiment of the present application.

FIG. 15 illustrates a structure of a photodetector according to an embodiment of the present application. In comparison with the photodetector 111 illustrated in FIG. 3, this embodiment has same functionality but use different structure. As illustrated in FIG. 15, some regions labeled as "n+" indicate these regions are heavily doped with N-type dopants and the symbol "G" stands for gate. In addition, this photodetector includes four terminals, two drain terminals and two gate terminals (respectively labeled as "Drain" and "Gate"). The source terminal is formed between the two gate terminals. Notably, the source terminal can be un-doped or doped (e.g., N-type dopants).

In this embodiment, two demodulation signals are respectively applied to the gate terminals so that the detecting signals can be respectively outputted from the drain terminals. In one implementation, one demodulation signal may be an inverted signal of the other demodulation signal. The waveform may be square waves, such as a clock signal or a pulse signal.

Figure 16:
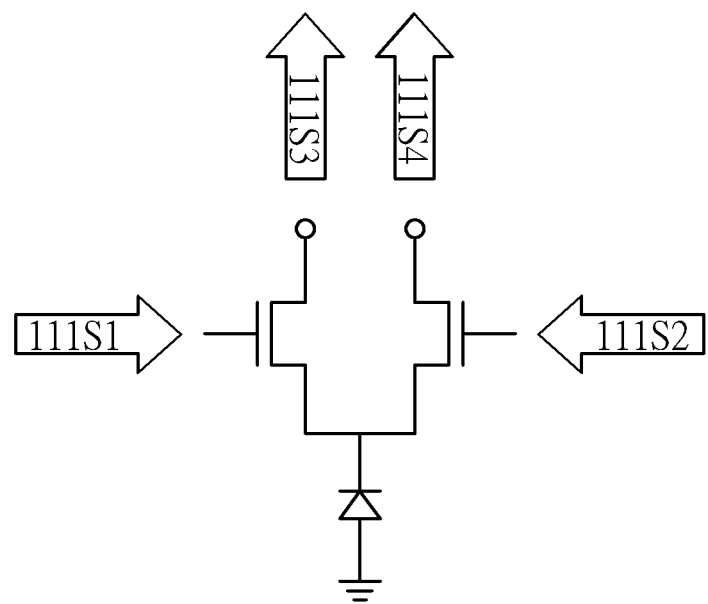
FIG. 16 illustrates an equivalent circuit of the photodetector illustrated in FIG. 15 according to an embodiment of the present application.

FIG. 16 illustrates an equivalent circuit of the photodetector illustrated in FIG. 15 according to an embodiment of the present application. Briefly, the photodetector structure illustrated in FIG. 15 and the equivalent circuit illustrated in FIG. 16 includes two transistors and a photodiode. The photodiode can generate photo-carriers and the two transistors can output the detecting signals 111S3 and 111S4 based on the demodulation signals 111S1 and 111S2.

Based on the embodiments disclosed above, the present application provides the apparatus and method capable of performing the depth/plane resolution control on a Ge-on-Si sensor (e.g., the image sensor 104). Ge-on-Si technology can absorb the light having a greater wavelength (e.g., a wavelength greater than 900 nanometer (nm)), which is an improvement to the laser safety. Furthermore, by means of the depth/plane resolution control, such as binning, interpolation or moving sensing, the image quality can be enhanced. Since the operation modes are adjustable, the disclosed apparatus can adjust the operation modes based on different scenarios, which may save the power and/or enhance the image quality. Moreover, the present application integrates calibration mechanisms so the output depth information can be closer to the real depth.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing apparatus, comprising:
an image sensor comprising a depth-image pixel array, the image sensor being configured to generate a first set of input information representing a first depth image at a first time and a second set of input information representing a second depth image at a second time, the first set of input information being associated with a first weighting value, the second set of input information being associated with a second weighting value;
a moving sensor configured to detect a movement of the image processing apparatus and to output a movement information based on the movement of the image processing apparatus; and
a three-dimensional (3D) image calculating module configured to determine the first and the second weighting values based on the movement information and to generate an output information based on the first and the second sets of input information and the first and the second weighting values;
wherein the depth-image pixel array comprises germanium.

2. The image processing apparatus of claim 1, wherein the image sensor further comprises a non-depth image pixel array.

3. The image processing apparatus of claim 1, wherein the moving sensor comprises an accelerator or a micro-electro-mechanical system (MEMS) gyroscope, wherein the first set of input information is generated before the movement, and wherein the second set of input information is generated after the movement.

4. The image processing apparatus of claim 1, wherein the output information is generated at least partially based on a binning calculation.

5. The image processing apparatus of claim 4, wherein the binning calculation is performed by dividing the first and the second sets of input information into a plurality of binning clusters.

6. The image processing apparatus of claim 5, wherein the plurality of binning clusters are dynamically adjusted.

7. The image processing apparatus of claim 1, wherein the output information is generated at least partially based on an interpolation calculation.

8. The image processing apparatus of claim 1, wherein the output information is generated at least partially based on a calibration.

9. The image processing apparatus of claim 1, wherein the output information is generated at least partially based on any combination of a binning calculation, interpolation calculation and a calibration.

10. An image processing method of an image processing apparatus, comprising:
generating, by an image sensor comprising a depth-image pixel array, a first set of input information representing a first depth image at a first time and a second set of input information representing a second depth image at a second time;

determining, by a moving sensor, a movement information based on a movement of the image processing apparatus;

determining a first weighting value based on the movement information;

determining a second weighting value based on the movement information; and generating an output frame based on the first set of input information, the second set of input information, the first weighting value and the second weighting value;

wherein the depth-image pixel array comprises germanium.

11. The image processing method of claim 10, wherein the image sensor further comprises a non-depth image pixel array.

12. The image processing method of claim 10, wherein the moving sensor comprises an accelerator or a micro-electro-mechanical system (MEMS) gyroscope.

13. The image processing method of claim 10, further comprising generating the output frame at least partially based on a binning calculation or an interpolation calculation.

14. The image processing method of claim 10, further comprising generating the output frame at least partially based on a calibration.

15. An image processing apparatus, comprising:

an image sensor comprising a depth-image pixel array, the image sensor being configured to generate a first set of input information representing a first depth image at a first location and a second set of input information representing a second depth image at a second location, the first set of input information being associated with a first weighting value, the second set of input information being associated with a second weighting value;

a moving sensor configured to detect a movement of the image processing apparatus and to output a movement information based on the movement of the image processing apparatus; and a three-dimensional (3D) image calculating module configured to determine the first and second weighting values based on the movement information and to generate output information based on the first and the second sets of input information and the first and the second weighting values;

wherein the depth-image pixel array comprises germanium.

16. The image processing apparatus of claim 15, wherein the image sensor further comprises depth image pixel array.

17. The image processing apparatus of claim 15, wherein the moving sensor comprises an accelerometer or a micro-electro-mechanical system (MEMS) gyroscope, wherein the first set of input information is generated before the movement, and wherein the second set of input information is generated after the movement.

18. The image processing apparatus of claim 15, wherein the output information is generated at least partially based on a binning calculation or an interpolation calculation.

19. The image processing apparatus of claim 15, wherein the output information is generated at least partially based on a calibration.

* * * * *